(12) United States Patent
Dai et al.

(10) Patent No.: US 9,030,924 B2
(45) Date of Patent: May 12, 2015

(54) METHOD FOR TIME DIVISION MULTIPLEX SERVICE PROTECTION

(75) Inventors: Ruichun Dai, Shenzhen (CN); Dezhi Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 664 days.

(21) Appl. No.: 13/257,946

(22) PCT Filed: Dec. 9, 2009

(86) PCT No.: PCT/CN2009/075437
§ 371 (c)(1),
(2), (4) Date: Feb. 28, 2012

(87) PCT Pub. No.: WO2011/022900
PCT Pub. Date: Mar. 3, 2011

(65) Prior Publication Data
US 2012/0148230 A1    Jun. 14, 2012

(30) Foreign Application Priority Data
Aug. 29, 2009    (CN) .......................... 2009 1 0168935

(51) Int. Cl.
| G06F 11/07 | (2006.01) |
|---|---|
| H04J 3/14 | (2006.01) |
| H04L 12/28 | (2006.01) |
| H04L 12/707 | (2013.01) |
| H04L 12/24 | (2006.01) |
| H04Q 11/00 | (2006.01) |

(52) U.S. Cl.
CPC ............ *H04L 45/22* (2013.01); *H04L 41/0663* (2013.01); *H04Q 11/0067* (2013.01); *H04J 3/14* (2013.01); *H04Q 2011/0081* (2013.01)

(58) Field of Classification Search
CPC .......... H04Q 11/0066; H04Q 11/0067; H04Q 11/0071; H04Q 11/0062; H04Q 11/04; H04Q 2011/0064; H04Q 11/0079; H04Q 11/0081; H04Q 11/0083; H04Q 11/0088; H04Q 2213/1301; H04Q 2213/13196; H04Q 2213/13292; H04Q 2213/13389; H04J 3/1694; H04J 14/00; H04J 14/0227; H04J 14/0245; H04J 14/0249; H04J 14/0267; H04J 14/08; H04J 2203/0067; H04B 10/2503; Y02B 60/35; Y02B 60/44; H04L 12/56; H04L 12/2697; H04L 12/2834; H04L 12/2881; H04L 12/4641; H04L 12/5695; H04L 29/12839; H04L 29/12924; H04L 41/0663; H04L 41/08; H04L 45/22; H04L 45/28; H04L 47/10; H04L 47/12; H04L 47/13; H04L 47/746; H04L 49/50; H04L 49/351; H04L 49/354; H04L 49/357; H04L 49/602; H04L 61/2514; H04L 61/6022
USPC ......... 370/216–228, 235–238, 241–253, 280, 370/294, 321, 337, 345–347, 442, 498; 398/1–25, 45, 58–64, 98
See application file for complete search history.

(56) References Cited

U.S. PATENT DOCUMENTS

| 6,351,582 | B1 | 2/2002 | Dyke et al. |
|---|---|---|---|
| 6,498,667 | B1 * | 12/2002 | Masucci et al. ............... 398/98 |
| 7,181,142 | B1 * | 2/2007 | Xu et al. ...................... 398/66 |
| 7,436,763 | B1 | 10/2008 | Phelps et al. |
| 7,831,145 | B2 * | 11/2010 | Gao et al. ...................... 398/5 |
| 7,876,762 | B2 * | 1/2011 | Yang ......................... 370/395.3 |
| 8,554,075 | B2 * | 10/2013 | Mizutani et al. ............. 398/58 |
| 8,718,087 | B1 * | 5/2014 | Johnston et al. ............. 370/463 |
| 8,824,893 | B2 * | 9/2014 | Hinderthur .................. 398/83 |
| 2003/0185201 | A1 | 10/2003 | Dorgan |
| 2010/0002591 | A1 * | 1/2010 | Mizutani et al. ............ 370/241.1 |
| 2010/0290782 | A1 * | 11/2010 | Lee et al. ..................... 398/58 |
| 2011/0064409 | A1 * | 3/2011 | Grobe ......................... 398/58 |
| 2012/0113835 | A1 * | 5/2012 | Alon et al. .................. 370/252 |
| 2012/0251108 | A1 * | 10/2012 | Chen et al. .................. 398/49 |

FOREIGN PATENT DOCUMENTS

| CN | 1479460 A | 3/2004 |
| CN | 1901419 A | 1/2007 |
| CN | 101068139 A | 11/2007 |
| CN | 101114882 A | 1/2008 |
| CN | 101257452 A | 9/2008 |

OTHER PUBLICATIONS

Supplementary European Search Report in European application No. 09848632.7, mailed on Mar. 19, 2014.

International Search Report in international application No. PCT/CN2009/075437, mailed on May 27, 2010.

English Translation of the Written Opinion of the International Search Authority in international application No. PCT/CN2009/075437, mailed on May 27, 2010.

\* cited by examiner

*Primary Examiner* — Tri H Phan

(74) *Attorney, Agent, or Firm* — Oppedahl Patent Law Firm LLC

(57) ABSTRACT

The present application provides a method for time division multiplex service protection. The method includes: on an OLT in a passive optical network, a working uplink port and a protection uplink port are set for a time division multiplex service and a protection group is created for the working uplink port and the protection uplink port; when a service flow protection for the time division multiplex service is triggered, the time division multiplex service flow is switched from the working uplink port to the protection uplink port, therefore realizing the protection for the time division multiplex service flow. The present application provides an uplink channel protection mechanism for important services in an access system, such as the time division multiplex service, which needs no protection switching protocol, and makes the service recovery time stand within 50 ms, thereby realizing fast and nondestructive recovery of the time division multiplex service.

9 Claims, 1 Drawing Sheet

METHOD FOR TIME DIVISION MULTIPLEX SERVICE PROTECTION

TECHNICAL FIELD

The present application relates to the Passive Optical Network (PON) technology, in particular to a method for time division multiplex service protection in a passive optical network access system.

BACKGROUND

In the face of access demand of future composite combined services, the passive optical network technology becomes a predominant technology for developing Fiber To The Home (FTTx) due to its natural advantages of high bandwidth and full service access capacity. Wherein, a PON system needs to provide electric interfaces such as E1/T1, even SDH/SONET optical interfaces to develop relative services, in order to meet the demands from business customers on Time division Multiplex (TDM) services (such as an E1/T1 private line), particularly, when it needs to join with a traditional Synchronous Digital Hierarchy (SDH)/Synchronous Optical Network (SONET) based is multi-service transmission platform network.

Generally, a PON system employs Circuit Emulation Service over Packet (CESoP) to provide access of TDM services. In addition to high-level service quality requirements of TDM services, such as low delay and no error code, nondestructive protection for services is also an important requirement. The above CESoP includes E1/T1, SDH/SONET optical interfaces, and etc. At present, a common method of realizing TDM service protection in a PON system is that the protection for CESoP service flows is realized through an existing PON physic port, or realized through port mirroring by utilizing the exchange function of internal layer 2 (L2). However, protection switching time cannot be guaranteed within 50 ms, TDM channel-level protection cannot be realized, and the practicality is poor, due to the existing of the problems, such as, an Optical Network Unit (ONU) may become online again and MAC address learning are involved.

SUMMARY

The present application provides a method for time division multiplex service protection, to solve the technical problem that there is no channel-level protection switching to recover all services in the channel fast in the prior art, in the event that the quality degradation of services or an interruption occurs on a TDM service working channel.

The method includes: setting a working uplink port and a protection uplink port for a time division multiplex service on an Optical Line Terminal (OLT) in a passive optical network, and creating a protection group for the working uplink port and the protection uplink port; when triggering service flow protection for the Time division Multiplex (TDM) service, switching the TDM service flow from the working uplink port to the protection uplink port, therefore realizing the protection for the TDM service flow.

Wherein, the protection group may be a 1:1 protection group, or a 1+1 protection group, or a N:1 protection group.

Wherein, the creating a protection group for the working uplink port and the protection uplink port further may include: configuring corresponding VLAN IDs for the working uplink port and the protection uplink port of the protection group, and setting a corresponding relationship between the TDM service flow and the working uplink port as well as a corresponding relationship between the TDM service flow and the protection uplink port.

Wherein, after creating a protection group for the working uplink port and the protection uplink port, the method may further include: configuring Access Control Lists (ACLS) for the working uplink port and the protection uplink port.

Wherein, when the protection for the TDM service flow is triggered, the switching the TDM service flow from the working uplink port to the protection uplink port may specifically include:

after the OLT detects that a working channel is interrupted or the TDM service in the working channel is failed, the OLT sets redirection of the TDM service flow by resetting an ACL rule and cooperating with the pre-configured VLAN ID corresponding to the protection uplink port, thereby the failed TDM service flow is switched to the protection port for receiving and transmitting.

Preferably, before the protection for the TDM service flow is triggered, the method may further include:

duplicating an identical duplicated TDM service flow for original TDM service flow required to be protected; configuring a same VLAN ID for both the original TDM service flow and the duplicated TDM service flow; setting an uplink port of the original TDM service flow as a working uplink port, and setting an uplink port of the duplicated TDM service flow as a protection uplink port; setting an ACL rule of the working uplink port as allowing the TDM service flow with the specific VLAN ID to pass, and setting an ACL rule of the protection uplink port as abandoning the TDM service flow with the specific VLAN ID;

and after the protection of the TDM service flow is triggered, the method may further is include:

exchanging ACL rules of the working uplink port and the protection uplink port, and switching the TDM service flow from the working uplink port to the protection uplink port and making it enter into an uplink network though the protection uplink port.

Wherein, before the protection of the TDM service flow is triggered, the method may further include:

configuring a specific VLAN ID for a TDM service flow required to be protected; setting an uplink port of the TDM service flow as a working uplink port; setting an ACL rule of the working uplink port as allowing the TDM with the specific VLAN ID to pass, and setting an ACL rule of the protection uplink port as abandoning the TDM service flow with the specific VLAN ID;

and after the protection of the TDM service flow is triggered, the method may further include:

resetting the uplink port of the TDM service flow as the protection uplink port, exchanging the ACL rules of the working uplink port and the protection uplink port, and switching the TDM service flow from the working uplink port to the protection uplink port and making it enter into an uplink network though the protection uplink port.

The present application provides an uplink channel protection mechanism for important service flows in an access system, such as TDM services, which does not need protection switching protocols, and makes the service recovery time stand within 50 ms, thereby helping the operators to realize fast and nondestructive recovery of TDM services, making the operators have capabilities of providing higher quality of service for important services, and increasing the customer satisfaction.

DETAILED DESCRIPTION

The specific embodiment of the present application will be described in details below in conjunction with drawings.

Figure 1:
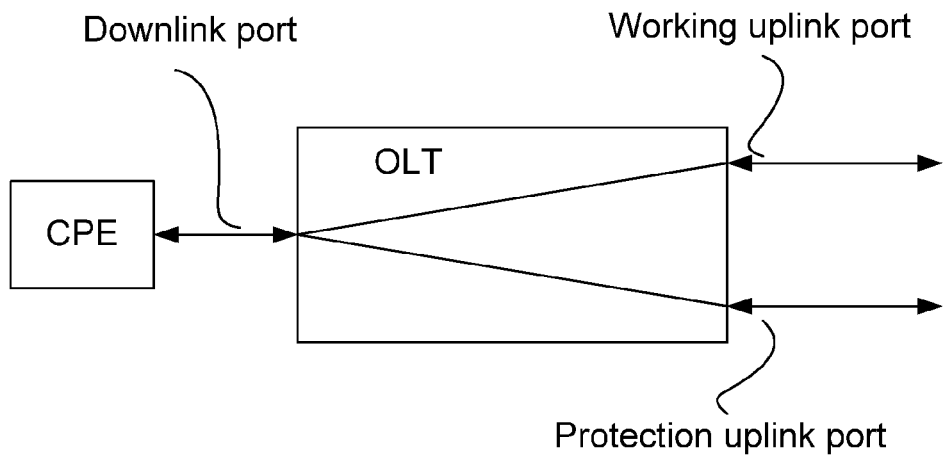
FIG. 1 illustrates a diagram of the working principle of the processing of recovery of the TDM service.

As shown in FIG. 1, a Client Premise Equipment (CPE) is connected with an OLT through a downlink port, and the OLT is provided with a working uplink port and a protection uplink port. The core idea of the present application is that, on an uplink port side of an OLT in an access network system, creating 1+1 or 1:1 backup of a TDM service channel by setting redirection for service flow and cooperating with Access Control List (ACL) function or 1:1 Virtual Local Area Network (VLAN), that is, protecting a working uplink port in real time by a protection uplink port, carrying out real-time switching according to the situation of the channel, and thus realizing fast service recovery.

Figure 2:
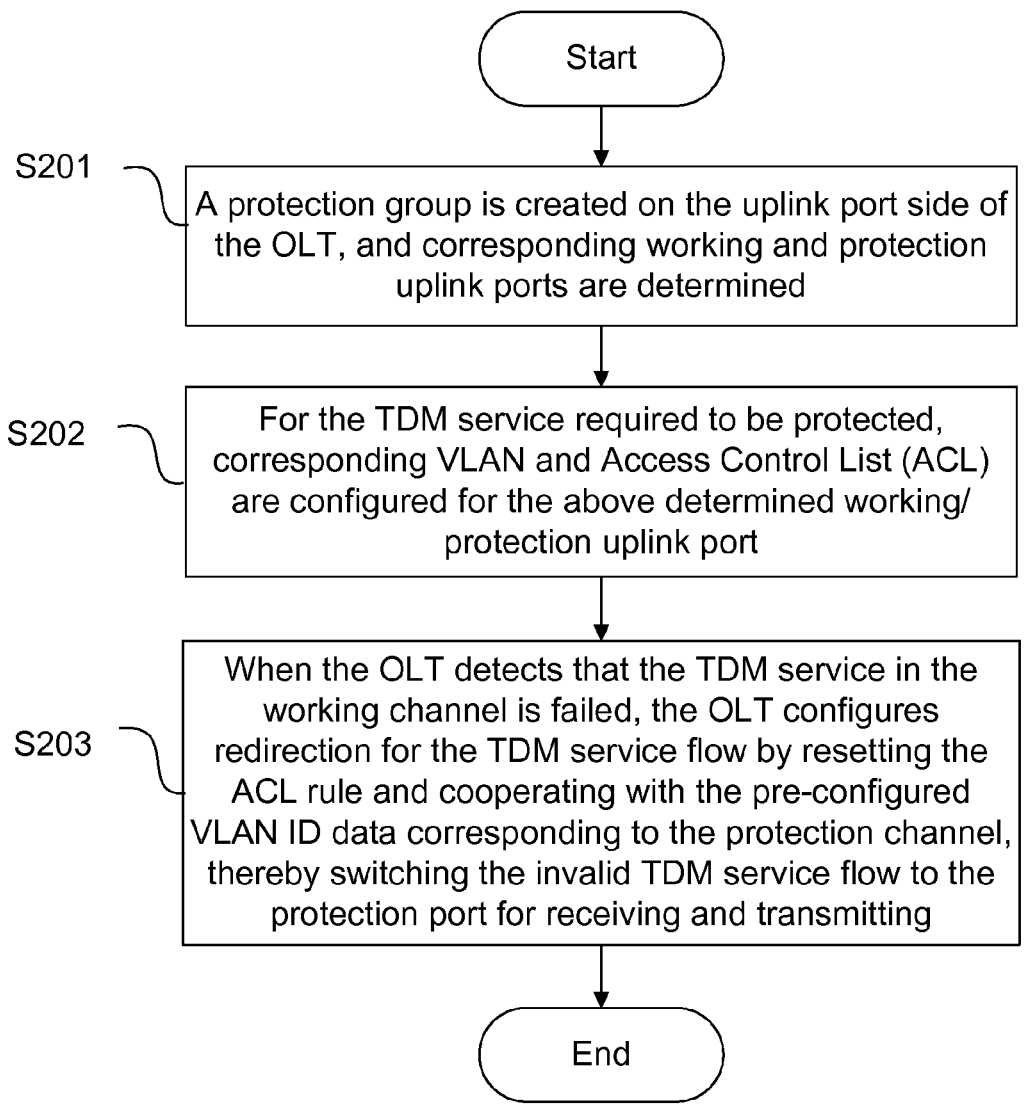
FIG. 2 illustrates a flow chart of a method for TDM service protection according to an embodiment of the present application.

With reference to FIG. 2 and in conjunction with FIG. 1, a method for TDM service protection according to an embodiment of the present application comprises:

S201: A protection group is created on an uplink port side of an OLT, and corresponding working uplink port and protection uplink port are determined;

S202: For the TDM service required to be protected, a corresponding VLAN ID is configured for the above determined working/protection uplink port, a corresponding relationship between the service flow and the working uplink port/protection uplink port is set, and an ACL is configured;

herein, 1:1 VLAN may be created for a protection uplink port channel to avoid time taken to carry out MAC address learning again after the switching to a protection channel. Conversely, the time will extend to tens of milliseconds if it is needed to carry out MAC address learning again.

S203: when the OLT detects that the TDM service in a working channel is failed due to interruption of the working channel, a protection control module of the OLT sets redirection for the TDM service flow by resetting an ACL rule and cooperating with is pre-configured VLAN ID data corresponding to the protection channel, to switch the failed TDM service flow to the protection port for receiving and transmitting, thereby realizing fast and nondestructive recovery of service.

Wherein, an existing technical means can be used for the OLT to check whether the TDM service in the working channel is failed.

Embodiments of realization of different backup protection of a TDM service channel will be described in details below.

Embodiment 1

Realization of 1+1 Backup Protection of the TDM Service Channel

During service configuration, Circuit Emulation Service (CES) pseudo wire service configuration is carried out on a CPE (may be an ONU) side, and each TDM service is distinguished with different C-VLAN IDs by means of labeling, for example, C-VLAN ID=1, in this way, the VLAN ID of this service flow is C-VLAN ID=1.

The CES pseudo wire service flow is provided with an outer label on an Optical Line Terminal (OLT) side, and the numeric value of an S-VLAN ID is used for identifying a TDM service, for example, if the S-VLAN ID is set as 128, it means this service is a TDM service flow. In this way, the VLAN ID of this service flow is S-VLAN ID=128, and C-VLAN ID=1.

The CES pseudo wire service flow is duplicated on a layer 2 exchange unit of the OLT, a same S-VLAN ID as the original service flow numeric value is also configured for the duplicated service flow. In this way, the duplicated service flow also has the same VLAN service label: S-VLAN ID=128, and C-VLAN ID=1.

Flow direction of service flows in the OLT is configured as follows: the original service flow is configured to flow to an uplink network through the working uplink port of the OLT; and the duplicated service flow is configured to flow to the uplink network through the protection uplink port of the OLT.

The ACL rule of the uplink ports of the OLT is configured as follows: the working uplink port is set to allow the service flow {S-VLAN ID=128, and C-VLAN ID=1} to pass, while the protection uplink port is set to abandon the above service flow {S-VLAN ID=128, and C-VLAN ID=1}.

When protection switching is triggered because it is detected by existing technologies that some problems occur in the working channel, the protection control module on the OLT side resets the ACL rule: the working port abandons the service flow {S-VLAN ID=128, and C-VLAN ID=1}, while the protection port allows the service flow {S-VLAN ID=128, and C-VLAN ID=1} to pass, and in this way, the original service flow can be cut off, so as to make the duplicated service flow to the uplink network through the protection uplink port, thereby realizing the purpose of fast and nondestructive protection for service.

Embodiment 2

Realization of 1:1 Backup Protection of the TDM Service Channel

During service configuration, CES pseudo wire service configuration is carried out on a CPE (may be an ONU) side, each TDM service is distinguished with different C-VLAN IDs by means of labeling, for example, C-VLAN ID=1, and in this way, the VLAN ID of this service flow is C-VLAN ID=1.

The CES pseudo wire service flow is provided with an outer label on an Optical Line Terminal (OLT) side, and the numeric value of an S-VLAN ID is used for identifying a TDM service, for example, if the S-VLAN ID is set as 128, it means this service is a TDM service flow, in this way, the VLAN ID of this service flow is S-VLAN ID=128, and C-VLAN ID=1.

This embodiment differs from embodiment 1 in that the duplication of a service flow is not carried out during protection.

Flow direction of service flows in the OLT is configured as follows: original service flow is configured to flow to an uplink network through the working uplink port of the OLT.

The ACL rule of the uplink ports of the OLT is configured as follows: the working uplink port is set to allow the service flow {S-VLAN ID=128, and C-VLAN ID=1} to pass, while the protection uplink port is set to abandon the service flow {S-VLAN ID=128, and C-VLAN ID=1}.

When protection switching is triggered because it is detected by existing technologies that some problems occur in the working channel, the OLT side carries out two steps of automatic setting: 1) the OLT deletes configuration data of the Step 505, and generates data to configure original service flow to flow to an uplink network through the protection uplink port of the OLT; 2) the protection control module of the OLT reconfigures the ACL rule: the working port abandons the service flow {S-VLAN ID=128, and C-VLAN ID=1}, while the protection port allows the service flow {S-VLAN ID=128, and C-VLAN ID=1} to pass, and in this way, the service flow, which originally flows to the uplink network through the working port, is redirected to the protection uplink port, thus realizing the purpose of fast and nondestructive protection of service.

Embodiment 3

Realization of N:1 Backup Protection of the TDM Service Channel

During service configuration, CES pseudo wire service configuration is carried out on CPE 1 to CPE N (may be ONUs) side, each CPE identifies its own TDM service through C-VLAN ID=x (it is a customer virtual local area network identity, representing a numeric value of a C-VLAN ID, with each CPE using a different numeric value), for example, CPE 1 identifies the C-VLAN ID of its own TDM service flow as 1, CPE 2 identifies the C-VLAN ID of its own TDM service flow as =2, and so on, N CPEs have N TDM service flows with their own C-VLAN IDs.

Each CES pseudo wire service flow is provided with same outer label on the OLT side, and a numeric value of an S-VLAN ID is used for identifying a TDM service, for example, if the S-VLAN ID is set as 128, it means this service is a TDM service flow. In this way, the VLAN IDs of multiple TDM service flows are: S-VLAN ID=128, and C-VLAN ID=x, wherein x is a C-VLAN ID provided by a CPE for its own service flow in the last step.

Flow direction of service flows in the OLT is configured as follows: all N original TDM service flows are configured to flow to an uplink network through the working uplink port of the OLT.

The ACL rule of the uplink ports of the OLT is configured as follows: the working uplink port is set to allow the service flow {S-VLAN ID=128, and C-VLAN ID=x} to pass, while the protection uplink port is set to abandon the service flow {S-VLAN ID=128, and C-VLAN ID=x}.

When protection switching is triggered because it is detected by existing technologies that some problems occur in the working channel, the OLT side carries out two steps of automatic setting: 1) the OLT deletes the configuration data generated in the last step, and regenerates data to configure original service flow to flow to the uplink network through the protection uplink port of the OLT; 2) the protection control module of the OLT reconfigures the ACL rule: the working port abandons the service flow {S-VLAN ID=128, and C-VLAN ID=x}, while the protection port allows the service flow {S-VLAN ID=128, and C-VLAN ID=x} to pass, and in this way, the service flow, which originally flows to the uplink network through the working port, is redirected to the protection uplink port, thus realizing the purpose of fast and non-destructive protection of service.

The above are only preferred embodiments of the present application and are not used for limiting the present application. For those skilled in the art, the present application may have various alternations and changes. Any modifications, equivalent substitutes and improvements which are made within the spirit and principle of the present application should be contained within the protection scope of the present application.

The invention claimed is:

1. A method for time division multiplex service protection, comprising: setting a working uplink port and a protection uplink port for a time division multiplex service on an Optical Line Terminal (OLT) in a passive optical network, and creating a protection group for the working uplink port and the protection uplink port; when triggering service flow protection for the time division multiplex service, switching the time division multiplex service flow from the working uplink port to the protection uplink port;

wherein the protection group is a 1:1 protection group, or a 1+1 protection group, or a N:1 protection group; and the creating a protection group for the working uplink port and the protection uplink port further comprises: configuring corresponding Virtual Local Area Network (VLAN) IDs for the working uplink port and the protection uplink port of the protection group, and setting a corresponding relationship between the time division multiplex service flow and the working uplink port, as well as a corresponding relationship between the time division multiplex service flow and the protection uplink port.

2. The method according to claim 1, further comprising: after creating a protection group for the working uplink port and the protection uplink port, configuring Access Control Lists (ACLs) for the working uplink port and the protection uplink port.

3. The method according to claim 2, wherein the switching the time division multiplex service flow from the working uplink port to the protection uplink port comprises:

after the OLT detects that a working channel is interrupted or the time division multiplex service in the working channel is invalid, setting redirection of the time division multiplex service flow by the OLT by resetting an ACL rule and according to the pre-configured VLAN ID corresponding to the protection uplink port, to switch the invalid time division multiplex service flow to the protection uplink port.

4. The method according to claim 3, further comprising: before triggering protection of the time division multiplex service flow, duplicating original time division multiplex service flow which is required to be protected; configuring a same VLAN ID for both the original time division multiplex service flow and the duplicated time division multiplex service flow; setting an uplink port of the original time division multiplex service flow as a working uplink port, and setting an uplink port of the duplicated time division multiplex service flow as a protection uplink port; setting an ACL rule of the working uplink port as allowing the time division multiplex service flow with the specific VLAN ID to pass, and setting an ACL rule of the protection uplink port as abandoning the time division multiplex service flow with the specific VLAN ID;

and the method further comprising: after triggering the protection of the time division multiplex service flow, exchanging the ACL rules of the working uplink port and the protection uplink port, and switching the time division multiplex service flow from the working uplink port to the protection uplink port and making it enter into an uplink network though the protection uplink port.

5. The method according to claim 3, further comprising: before triggering protection of the time division multiplex service flow, configuring a VLAN ID for a time division multiplex service flow which is required to be protected; setting an uplink port of the time division multiplex service flow as a working uplink port; setting an ACL rule of the working uplink port as allowing the time division multiplex service flow with the VLAN ID to pass, and setting an ACL rule of the protection uplink port as abandoning the time division multiplex service flow with the specific VLAN ID;

and the method further comprising: after triggering the protection of the time division multiplex service flow, resetting the uplink port of the time division multiplex service flow as the protection uplink port, exchanging the ACL rules of the working uplink port and the protection uplink port, and switching the time division multiplex service flow from the working uplink port to the protection uplink port and making it enter into an uplink network though the protection uplink port.

6. The method according to claim 2, further comprising: before triggering protection of the time division multiplex service flow, duplicating original time division multiplex service flow which is required to be protected; configuring a same VLAN ID for both the original time division multiplex service flow and the duplicated time division multiplex service flow; setting an uplink port of the original time division multiplex service flow as a working uplink port, and setting an uplink port of the duplicated time division multiplex service flow as a protection uplink port; setting an ACL rule of the working uplink port as allowing the time division multiplex service flow with the specific VLAN ID to pass, and setting an ACL rule of the protection uplink port as abandoning the time division multiplex service flow with the specific VLAN ID;

and the method further comprising: after triggering the protection of the time division multiplex service flow, exchanging the ACL rules of the working uplink port and the protection uplink port, and switching the time division multiplex service flow from the working uplink port to the protection uplink port and making it enter into an uplink network though the protection uplink port.

7. The method according to claim 2, further comprising: before triggering protection of the time division multiplex service flow, configuring a VLAN ID for a time division multiplex service flow which is required to be protected; setting an uplink port of the time division multiplex service flow as a working uplink port; setting an ACL rule of the working uplink port as allowing the time division multiplex service flow with the VLAN ID to pass, and setting an ACL rule of the protection uplink port as abandoning the time division multiplex service flow with the specific VLAN ID;

and the method further comprising: after triggering the protection of the time division multiplex service flow, resetting the uplink port of the time division multiplex service flow as the protection uplink port, exchanging the ACL rules of the working uplink port and the protection uplink port, and switching the time division multiplex service flow from the working uplink port to the protection uplink port and making it enter into an uplink network though the protection uplink port.

8. The method according to claim 1, further comprising: before triggering protection of the time division multiplex service flow, duplicating original time division multiplex service flow which is required to be protected; configuring a same VLAN ID for both the original time division multiplex service flow and the duplicated time division multiplex service flow; setting an uplink port of the original time division multiplex service flow as a working uplink port, and setting an uplink port of the duplicated time division multiplex service flow as a protection uplink port; setting an ACL rule of the working uplink port as allowing the time division multiplex service flow with the specific VLAN ID to pass, and setting an ACL rule of the protection uplink port as abandoning the time division multiplex service flow with the specific VLAN ID;

and the method further comprising: after triggering the protection of the time division multiplex service flow, exchanging the ACL rules of the working uplink port and the protection uplink port, and switching the time division multiplex service flow from the working uplink port to the protection uplink port and making it enter into an uplink network though the protection uplink port.

9. The method according to claim 1, further comprising: before triggering protection of the time division multiplex service flow, configuring a VLAN ID for a time division multiplex service flow which is required to be protected; setting an uplink port of the time division multiplex service flow as a working uplink port; setting an ACL rule of the working uplink port as allowing the time division multiplex service flow with the VLAN ID to pass, and setting an ACL rule of the protection uplink port as abandoning the time division multiplex service flow with the specific VLAN ID;

and the method further comprising: after triggering the protection of the time division multiplex service flow, resetting the uplink port of the time division multiplex service flow as the protection uplink port, exchanging the ACL rules of the working uplink port and the protection uplink port, and switching the time division multiplex service flow from the working uplink port to the protection uplink port and making it enter into an uplink network though the protection uplink port.

* * * * *